United States Patent [19]

Fair et al.

[11] Patent Number: 5,013,359
[45] Date of Patent: May 7, 1991

[54] PROCESS FOR RECOVERING GOLD FROM REFRACTORY SULFIDIC ORES

[75] Inventors: Kenneth J. Fair, Willowdale; Gezinus Van Weert, Caledon East; John C. Schneider, Acton, all of Canada

[73] Assignee: Hydrochem Developments Ltd., Brampton, Ontario, Canada

[21] Appl. No.: 264,790

[22] Filed: Oct. 31, 1988

[51] Int. Cl.$^5$ .................. C22B 11/00; B03D 1/00
[52] U.S. Cl. ............................. 75/744; 423/26; 423/27; 209/164
[58] Field of Search ............ 423/26, 27, 543; 75/421, 423, 426, 428, 631, 637, 720, 743, 744; 209/164, 166, 167

[56] References Cited

U.S. PATENT DOCUMENTS

| | | | |
|---|---|---|---|
| 571,369 | 11/1896 | Hunt | 75/105 |
| 3,701,421 | 10/1972 | Maxwell | 423/26 |
| 3,793,429 | 2/1974 | Queneau et al. | 75/118 R |
| 3,988,428 | 10/1976 | Dorr et al. | 423/543 |
| 4,010,246 | 3/1977 | Steinrotter et al. | 423/543 |
| 4,138,248 | 2/1979 | Narain | 75/743 |
| 4,353,740 | 10/1982 | Dunn | 75/423 |
| 4,670,051 | 6/1987 | Schneider | 423/27 |
| 4,834,793 | 5/1989 | Schneider et al. | 423/27 |

Primary Examiner—Michael L. Lewis
Assistant Examiner—Steven Bos
Attorney, Agent, or Firm—Ridout & Maybee

[57] ABSTRACT

A process for recovering gold from a refractory sulfidic ore which has been suspended in an aqueous slurry and oxidized using nitric acid so that substantially all of the gold in the ore is made available for recovery and at least a portion of the sulfidic components present during the oxidation are oxidized to elemental sulfur, comprises bubbling air as a discontinuous phase upwardly through the oxidized slurry, thereby creating a froth containing elemental gold and sulfur. The froth is separated from the slurry to provide a concentrate, and the gold is recovered from the concentrate.

15 Claims, 2 Drawing Sheets

PROCESS FOR RECOVERING GOLD FROM REFRACTORY SULFIDIC ORES

The invention is a process for recovering gold from a refractory sulfidic ore which has been subjected to hydrometallurgical oxidation with nitric acid to provide a material comprising gold which has been released from encasement within the ore structure as well as at least some elemental sulfur. The term "ore" as used in this specification includes an ore concentrate and other mineral bearing materials having elements or compounds which would be desirable to recover. The invention is particularly useful in the downstream processing of a refractory sulfidic gold bearing ore such as an ironsulfur mineral (e.g. pyrite) or an arsenopyrite which has been subjected to nitric acid oxidation in accordance to one of the processes described in U.S. Pat. No. 4,670,051 and U.S. patent application Ser. No. 014,815 filed Feb. 13, 1987.

The hydrometallurgical nitric acid oxidation of an ore is an efficient and economic means for delivering oxygen to the ore for reaction, particularly if the nitric acid cycle is utilized as described in the aforementioned patent and application. Briefly, nitric acid, a powerful oxidizer, reacts with crushed or ground ore particles suspended in a slurry to oxidize the ore and generate NO gas. NO, like oxygen, has low solubility in water, so it readily enters the gas phase where it reacts with any oxygen present at apparently a diffusion controlled rate to form $NO_2$. The $NO_2$, however, is very soluble in water, even in the acidic aqueous solutions at 85–95° C. which are typical of the nitric acid oxidation conditions used in the process. The dissolved $NO_2$ makes oxygen available for reaction with the ore by reacting with water to form nitric acid.

The present invention addresses several problems which have been encountered in the processing of the ore subsequent to the nitric acid oxidation step. Particularly in relation to the recovery of gold by cyanidation, it has been shown that the inventive nitric acid oxidation of a refractory ore enabled substantial recovery of the entrained gold. However, it was noted that in relation to arsenopyrite ores particularly, the recovery of gold by cyanidation following nitric acid oxidation was often only about 75% of the contained gold. It was discovered that a hot lime treatment of the oxidized ore prior to cyanidation enabled the nearly complete recovery of gold, indicating that elemental sulfur, solubilized by the hot lime, was probably the cause of the lower yields.

Processing nitric acid oxidized arsenopyrite gold bearing ores, including a hot lime conditioning step, involves at least three filtrations. While these filtration steps do not render the overall process uneconomic, it would be desirable to eliminate as many of them as possible since they represent a significant capital cost and potential sites of difficulty with respect to handling of the process materials. Thus, the initial filtration of the oxidized slurry removed from the reactor must be conducted in a closed vessel due to the $NO_x$ (i.e. NO, $NO_2$ and related gaseous nitrogen oxides) content of the liquid which poses a hazard to workers. The hot lime treatment prior to cyanidation usually creates slimes, which are difficult to deal with in the following filtration step, and noxious gases, e.g. $H_2S$. Therefore, elimination of the need to include a hot lime treatment would be advantageous.

The present invention makes use of the surprising discovery that the highly acidic slurry of oxidized ore removed from the reactor can be subjected to a flotation step in which the elemental sulfur and gold components are concentrated in the froth. The air used in the flotation also strips any residual $NO_x$ from the process solution so that the barren slurry can be further processed without the danger of worker exposure to unsafe levels of $NO_x$. The two troublesome filtration steps mentioned are thereby eliminated, with the added benefit that the need to use cyanidation to recover the gold is also removed. The gold/sulfur concentrate obtained from the flotation may be oxidized pyrometallurgically, such as in a rotary kiln or in a roaster to remove the sulfur component as $SO_2$, and then smelted to obtain gold bullion. These improvements in the downstream processing of nitric acid oxidized arsenopyrite ores provide the mining industry with a truly economic and environmentally safe process for recovering gold from refractory sulfidic ores, those ores which hitherto had been considered of low commercial value due to the need to handle sulfur and arsenic bearing waste streams.

Accordingly, the invention provides a process for recovering gold from a refractory sulfidic ore which has been suspended in an aqueous slurry and oxidized using nitric acid so that substantially all of the gold in the ore is made available for recovery and at least a portion of sulfidic components present during the oxidation are oxidized to elemental sulfur. The process comprises bubbling a process compatible gas such as air or process tail gas as a discontinuous phase upwardly through the oxidized slurry, thereby creating a froth containing elemental gold and sulfur. The froth is separated from the slurry to provide a concentrate which is preferably oxidized to remove the sulfur component. Gold is preferably recovered from the oxidized concentrate by conventional means, such as smelting or cyanidation.

Figure 1:
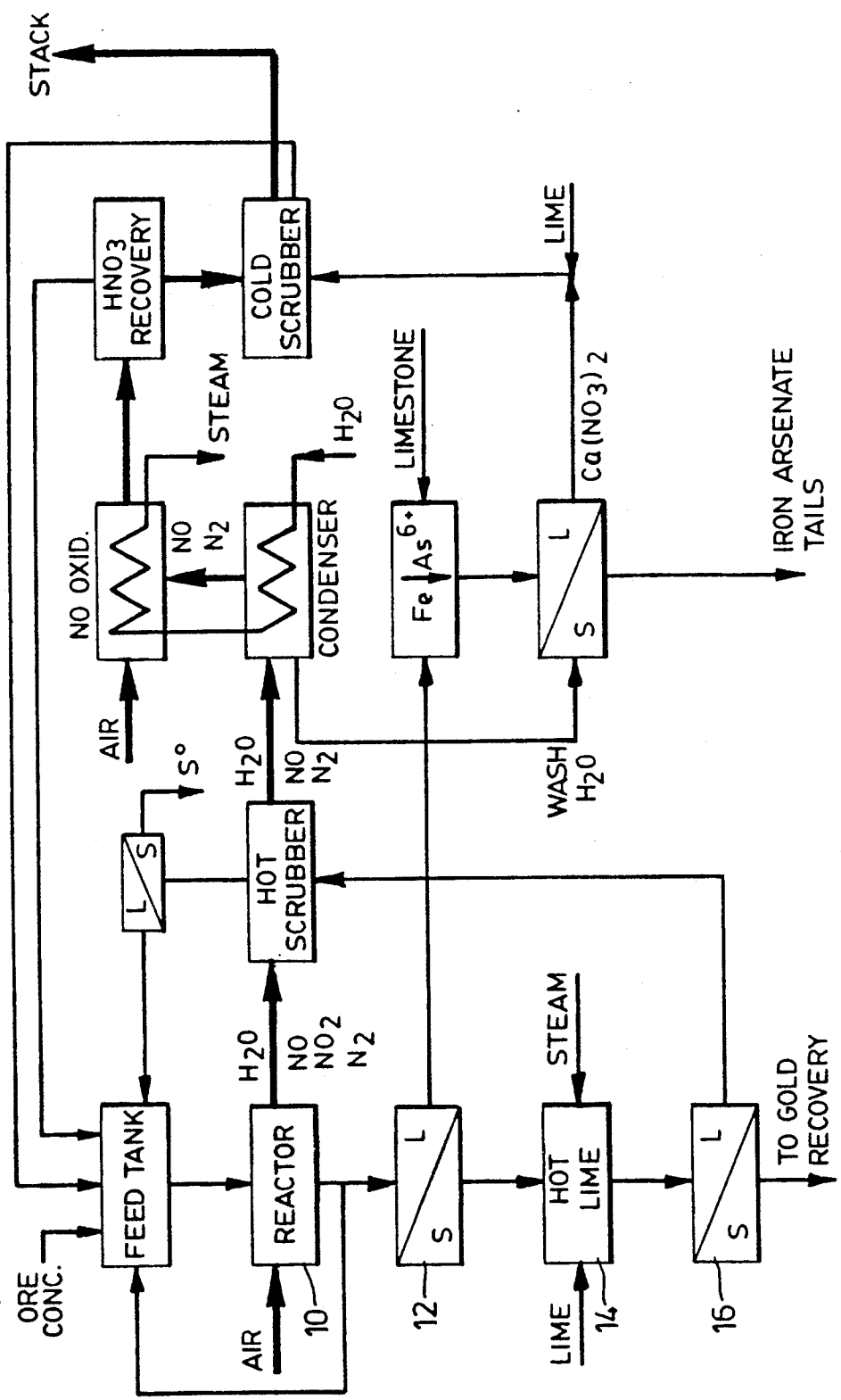
FIG. 1 is a flow diagram of an oxidation process which does not incorporate the invention. Heavy lines indicate the flow of gases.

The flow chart of an oxidation process for a refractory gold ore in accordance with the invention described in U.S. patent application Ser. No. 014,815 is shown in FIG. 1. The ore slurry is oxidized by nitric acid in the reactor 10, following which the solid and liquid phases are separated at a filter 12 so that the liquid can be recycled and the solid phase, containing the gold, can be further processed for gold recovery.

The liquid being filtered at the filter 12 contains dissolved $HNO_3$ reduction products such as NO and $NO_2$ which pose a health hazard to workers. The filter 12, therefore, is enclosed so that emissions of nitrogen oxides is contained.

The solids recovered at the filter 12 proceed on to gold recovery by, for example, conventional cyanidation. A problem encountered in the overall processing of a sulfidic gold ore at this stage was the deleterious effect which sulfur exerted on cyanidation. By way of example, the formation of elemental sulfur upon the oxidation of arsenopyrite with nitric acid may be represented as follows:

$$16FeAsS + 64HNO_3 \rightarrow 16FeAsO_4 + 8H_2SO_4 + 24H_2O + S_8 + 64NO$$

The elemental sulfur formed under process oxidizing conditions is stable and can account for as much as 70% of the total sulfur content of the ore. This elemental sulfur is undesirable because it ties up gold or at least slows down the extraction of gold during cyanidation. Also, sulfur consumes cyanide through the formation of thiocyanate.

As shown in FIG. 1, the solids separated at the filter 12 can be subjected to a hot lime treatment 14 in order to dissolve the sulfur. Thus, treatment of the solids from the filter 12 in $Ca(OH)_2$ solution at pH 10–10.5 and 80° C. results in solids having a very low sulfur content which when subjected to cyanidation provide extraction of about 98% of the contained gold. Without the hot lime step the cyanidation gives about a 75% gold extraction.

The hot lime step 14 is not a happy solution to the sulfur problem because, as seen in FIG. 1, a second filtration 16 is required before the solids can proceed to cyanidation. The filtration step 16 is technically complicated by the formation of slimes in the hot lime treatment step 14. As the skilled person will appreciate, the elimination of a slime forming step is to be highly desired, particularly at a late stage in the process. Also, the hot lime treatment results in some dissolution of the gold present, so added care must be taken to minimize this effect. The present invention provides a solution to this problem of sulfur contamination which has the benefit of eliminating the filtration steps 12 and 16 as well as the hot lime step 14 as shown in FIG. 1. Additionally, the invention gives the operator the option to recover gold without cyanidation.

Froth flotation techniques are well known but poorly understood as methods for concentration of a mineral contained in a raw ore. Conventional thinking in this art of froth flotation suggests that the ability of a substance to attach itself to rising bubbles is linked to the hydrophobicity of that substance in the environment of the flotation device. Strongly acidic, e.g. pH 0, aqueous solutions such as those withdrawn from the nitric acid reactor 10 would not be expected to be suitable for elemental sulfur flotation purposes. That sulfur may be floated under these conditions indicates the stable nature of the elemental sulfur which is produced in the nitric acid oxidation of the ore. The high redox potential, e.g. 750 mV SCE, of the oxidized ore slurry removed from the reactor 10, was not expected to provide a useful environment for in situ gold flotation. However, it was surprisingly discovered that flotation of this acidic oxidized slurry provided a rapid and nearly complete concentration of the gold content in the froth along with the elemental sulfur.

These flotation results are indicated by the following example.

A totally refractory ore concentrate, obtained from cyanidation tailings, having 27% Fe, 10.8% As, 23.2% S, and 0.93 oz/ton Au was oxidized with nitric acid at 80° C. in the reactor 10. Approximately 5 litres of the oxidized slurry, containing solids assaying 4.2 oz/ton Au, was transferred to a 150×150×300 mm stainless steel flotation cell and air at a rate of 9.5 l/min. was introduced through a stainless steel bubble cap type sparger underneath a 50 mm diameter hydrofoil impeller rotating at 1900 rpm. Froth was scraped every 5 seconds, and after 15 minutes 96% of the sulfur and 90% of the gold was collected in a concentrate assaying 49% $S^o$ and 10.8 oz/ton Au. The tails, containing about 65% of the total starting weight of material subjected to the flotation, assayed 0.96% $S^o$ and 0.7 oz/ton Au.

It should be noted from the foregoing example that flotation of gold and sulfur was obtained without conditioning the oxidized ore slurry, that is, no frothers or other flotation aids were added to the slurry. The flotation results indicated by this example suggest that further scavenging of the tails would be productive in reducing the gold content of the tails to less than 5% of that contained in the ore.

Figure 2:
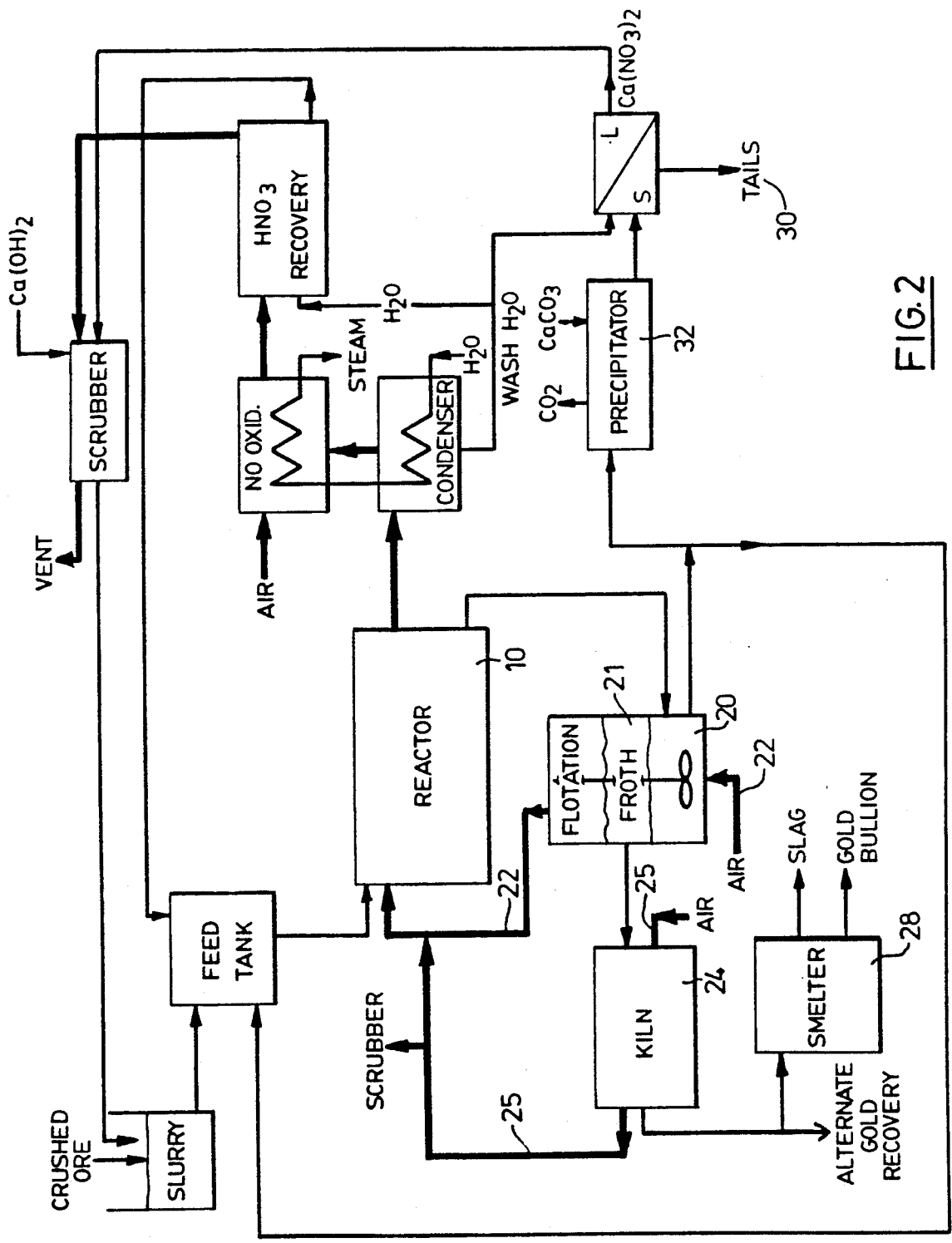
FIG. 2 is a flow diagram of an oxidation process which incorporates the invention. Heavy lines indicate the flow of gases.

The invention, as it relates to the nitric acid oxidation process described in U.S. patent application Ser. No. 014,815, is shown in FIG. 2. The oxidized slurry is removed from the nitric acid oxidation reactor 10 and subjected to a flotation at flotation cell 20. The air stream 22 bubbled into the flotation cell 20 causes dissolved $NO_x$ to be stripped from the liquid phase. Routing the exhaust gas stream 22 from the flotation cell 20 to the reactor 10 serves to contain $NO_x$ within the system and renders the liquid phase in the flotation cell 20 essentially free of $NO_x$ so that worker safety considerations regarding $NO_x$ exposure are met. In a further simplification, the flotation cell 20 could be incorporated as a final compartment of the reactor 10.

The froth 21 is collected, and the resultant concentrate comprising gold and sulfur is subjected to further processing in order to remove the sulfur. Sulfur removal may be simply achieved by pyrometallurgical air oxidation to form $SO_2$. This step may be carried out in a rotary kiln 24 or other type of roaster. The air stream 25 for the sulfur oxidation can be utilized in the nitric acid ore oxidation by being routed to the reactor 10, with the excess being scrubbed to remove $SO_2$ prior to venting. The sulfur of the concentrate may be removed by melting it and filtering the solid gold particles from the liquid sulfur.

The concentrate removed from the kiln 24 may be of sufficient gold content to proceed directly to a smelting operation 28 for the production of gold bullion. Thus, the invention provides a simple and elegant solution to the processing of the highly acidic slurry which is removed from the reactor 10, the invention obviating the need to perform a hot lime conditioning of the oxidized ore solids with the accompanying filtration steps and other disadvantages. Further, the need to extract the available gold by cyanidation is also eliminated if the gold content of the calcine from the kiln 24 is high enough.

These advantages present a significant capital cost reduction as well as a significant operating cost reduction to the overall process. Process reagents and raw materials are recycled as needed to achieve maximum gold recovery with minimal environmental impact. The gases leaving the system shown in FIG. 2 are scrubbed of $SO_2$ and $NO_x$ while the tails 30 from the ore processing stream contain stable oxidized species such as iron arsenate.

As shown in FIG. 2, an added benefit of the present process is achieved in the treatment of the slurry tails from the flotation cell 20 which are transferred to the precipitator 32. Because the liquid phase entering the precipitator 32 has been stripped of $NO_x$ in the flotation cell 20, $CO_2$ formed during the precipitation of iron arsenate using limestone can be vented to the atmosphere.

The foregoing description of the preferred embodiment of the invention is not intended to limit the scope of the invention as defined in the following claims.

What is claimed is:

1. A process for recovering gold from a refractory sulfidic ore which has been suspended in an aqueous slurry and oxidized using nitric acid so that substantially all of the gold in the ore is made available for recovery and at least a portion of sulfidic components present during the oxidation are oxidized to elemental sulfur, comprising:

bubbling a process compatible gas as a discontinuous phase upwardly through the oxidized slurry which is strongly acidic and without conditioning the oxidized slurry, thereby creating a froth containing elemental sulfur and gold;

separating the froth from the slurry to provide a concentrate; and recovering gold from the concentrate.

2. A process as claimed in claim 1, wherein the gas is air.

3. A process as claimed in claim 1, wherein the froth is collected for a sufficient time to obtain a concentrate having at least 80% of the gold contained in the oxidized slurry.

4. A process as claimed in claim 1, further comprising oxidizing the concentrate to remove substantially all of the elemental sulfur therefrom.

5. A process as claimed in claim 4, wherein the elemental sulfur in the concentrate is oxidized pyrometallurgically.

6. A process as claimed in claim 5, wherein the concentrate is oxidized in a rotary kiln.

7. A process as claimed in claim 5, wherein the oxidation of the concentrate is carried out using an oxygen containing gas.

8. A process as claimed in claim 7, wherein the oxygen containing gas is first used to oxidize the concentrate and is then used in the nitric acid oxidation of the refractory sulfidic ore.

9. A process as claimed in claim 1, wherein the gold is recovered from the concentrate by melting the sulfur and filtering the solid gold particles from the liquid sulfur.

10. A process as claimed in claim 4, further comprising smelting the oxidized concentrate to obtain gold bullion.

11. A process as claimed in claim 4, further comprising cyanidation of the oxidized concentrate to recover the gold therefrom.

12. A process as claimed in claim 1, wherein the refractory sulfidic ore is an arsenopyrite.

13. A process as claimed in claim 1, wherein the refractory sulfidic ore is an iron-sulfur mineral.

14. A process as claimed in claim 1, wherein process compatible gas is bubbled upwardly through the oxidized slurry by means of a gas outlet positioned below the impeller of a high speed agitator.

15. A process as claimed in claim 2, wherein the air bubbled through the oxidized slurry is subsequently utilized in the nitric acid oxidation of the ore.

* * * * *